United States Patent
Reches (10) Patent No.: US 7,664,146 B1
(45) Date of Patent: *Feb. 16, 2010

(54) DYNAMIC ALIGNMENT FOR DATA ON A PARALLEL BUS

(75) Inventor: Erez Reches, Misgav (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 405 days.

This patent is subject to a terminal disclaimer.

(21) Appl. No.: 11/699,260

(22) Filed: Jan. 29, 2007

Related U.S. Application Data (63) Continuation of application No. 10/247,658, filed on Sep. 18, 2002, now Pat. No. 7,170,907.

(60) Provisional application No. 60/357,316, filed on Feb. 15, 2002.

(51) Int. Cl.
*H04J 3/06* (2006.01)

(52) U.S. Cl. .................... 370/516; 370/517; 375/371

(58) Field of Classification Search .............. None
See application file for complete search history.

(56) References Cited

U.S. PATENT DOCUMENTS

| | | | | |
|---|---|---|---|---|
| 5,636,254 | A * | 6/1997 | Hase et al. ............... | 375/371 |
| 6,031,847 | A   | 2/2000 | Collins et al. | |
| 6,418,537 | B1  | 7/2002 | Yang et al. ............... | 713/400 |
| 6,704,890 | B1  | 3/2004 | Carotti et al. ............ | 714/700 |
| 6,803,872 | B2* | 10/2004| DeRyckere et al. ...... | 341/160 |
| 6,928,571 | B1* | 8/2005 | Bonella et al. ........... | 713/401 |
| 7,406,616 | B2* | 7/2008 | Hendrickson et al. .... | 713/500 |
| 2002/0093994 | A1 | 7/2002 | Hendrickson et al. .... | 370/536 |
| 2005/0229049 | A1 | 10/2005 | Collins .................... | 714/699 |
| 2006/0129869 | A1 | 6/2006 | Hendrickson et al. .... | 713/503 |

FOREIGN PATENT DOCUMENTS

| | | |
|---|---|---|
| WO | WO99/09687 A1 | 2/1999 |
| WO | WO99/53406 A2 | 10/1999 |
| WO | WO99/53406 A3 | 10/1999 |
| WO | WO00/36795 A1 | 6/2000 |
| WO | WO00/36796 A1 | 6/2000 |
| WO | WO00/36797 A1 | 6/2000 |
| WO | WO00/36874 A1 | 6/2000 |

OTHER PUBLICATIONS

Altera Corp., Using CDS in APEX II Devices, Application Note 157, Aug. 2001, ver. 1.1., Altera Corp., San Jose, CA.

Cam, Richard, et al., Implementation Agreement, System Packet Level 4 (SPI-4) Phase 2:OC-192 System Interface for Physical and Link Layer Devices, Jan. 2001, The Optical Internetworking Forum, Fremont, CA.

* cited by examiner

*Primary Examiner*—Ajit Patel (57) ABSTRACT

An alignment circuit comprises a plurality of inputs that receive corresponding data signals, wherein each of the corresponding data signals includes a training pattern. A plurality of delay lines correspond to each of the plurality of inputs, receive the corresponding data signals, receive a plurality of corresponding delay signals, and delay each of the data signals according to the corresponding delay signals. A controller receives the corresponding data signals and generates the plurality of corresponding delay signals based on the training patterns of respective ones of the data signals.

27 Claims, 9 Drawing Sheets

DYNAMIC ALIGNMENT FOR DATA ON A PARALLEL BUS

CROSS-REFERENCE TO RELATED APPLICATIONS

This application is a continuation of U.S. patent application Ser. No. 10/247,658 filed on Sep. 18, 2002, which application claims the benefit of U.S. Provisional Patent Application Ser. No. 60/357,316, filed Feb. 15, 2002. The disclosures of the above applications are incorporated herein by reference.

BACKGROUND

The present invention relates generally to data communications. More particularly, the present invention relates to deskewing data received over multiple parallel communication channels.

The field of electronic data communications is increasingly important to the global economy. High-speed data networks are now used to transport data representing text, music, images, and even moving pictures. One method of data transmission is serial transmission, in which data is transmitted over a single communications channel. Another method of data transmission is parallel transmission, in which data is transmitted over multiple parallel communications channels simultaneously. Parallel transmission is increasingly popular as it moves data more rapidly over a network, resulting in higher data transmission speeds.

One disadvantage of parallel transmission is data skew, which occurs when the parallel communication channels have different propagation delays. Therefore data sent simultaneously over the parallel communications channels arrives at different times. It can be difficult or impossible to correctly sample the skewed data.

SUMMARY

In general, in one aspect, the invention features a method, apparatus, and computer-readable media for aligning n data signals received over a parallel bus, each of the n data signals comprising a training pattern, wherein n is at least two. It comprises delaying each of the n data signals in accordance with a corresponding analog delay signal, thereby providing n corresponding delayed data signals; providing each of the corresponding analog delay signals based on the training pattern in the respective delayed data signal; delaying each of the delayed data signals by m bit times in accordance with a corresponding digital delay signal, thereby providing n corresponding aligned data signals, wherein m is greater than, or equal to, zero; and providing each of the corresponding digital delay signals based on the training pattern in the corresponding delayed data signal.

Particular implementations can include one or more of the following features. The training pattern comprises a plurality of predetermined transitions from a first predetermined data value to a second predetermined data value, and the method further comprises for each of the n delayed data signals: determining a bit time of the delayed data signal based on the training pattern in the respective delayed data signal; sampling the delayed data signal once each bit time to obtain data samples; and providing the corresponding analog delay signal such that the respective analog delay line delays the respective data signal so that the transitions occur substantially midway between the data samples. Each of the analog delay signals represents an amount of delay imposed upon the respective data signal, and providing each of the corresponding analog delay signals comprises obtaining from the delayed data signal a first early sample preceding a first one of the transitions and a first late sample following the first one of the transitions; then increasing the delay imposed upon the data signal from a current delay by substantially one half of the bit time; then obtaining from the delayed data signal a second late sample following a second one of the transitions; then decreasing the delay imposed upon the data signal from the current delay by substantially one half of the bit time; then obtaining from the delayed data signal a second early sample preceding a third one of the transitions; and then decreasing the delay imposed upon the data signal from the current delay by a predetermined amount when the values of the first and second late samples differ, and increasing the delay imposed upon the data signal from the current delay by the predetermined amount when the values of the first and second early samples differ. Determining a bit time comprises repeatedly increasing the amount of delay imposed upon the respective data signal by the respective analog delay line until the first sample following the transition changes value, thereby producing a first delay increase; and then repeatedly increasing the amount of delay imposed upon the respective data signal by the respective analog delay line until the second sample following the transition changes value, thereby producing a second delay increase; wherein the difference between the first and second delay increases is the bit time of the respective delayed data signal. The training pattern comprises a plurality of predetermined transitions from a first predetermined data value to a second predetermined data value, and providing each of the corresponding digital delay signals comprises sampling the delayed data signal to obtain a plurality of consecutive data samples including a data sample preceding one of the transitions and a data sample following the one of the transitions; and selecting the number m of bit times based on a location of the training pattern in the plurality of consecutive samples. The parallel bus conforms to the SPI-4.2 standard.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

Figure 1:
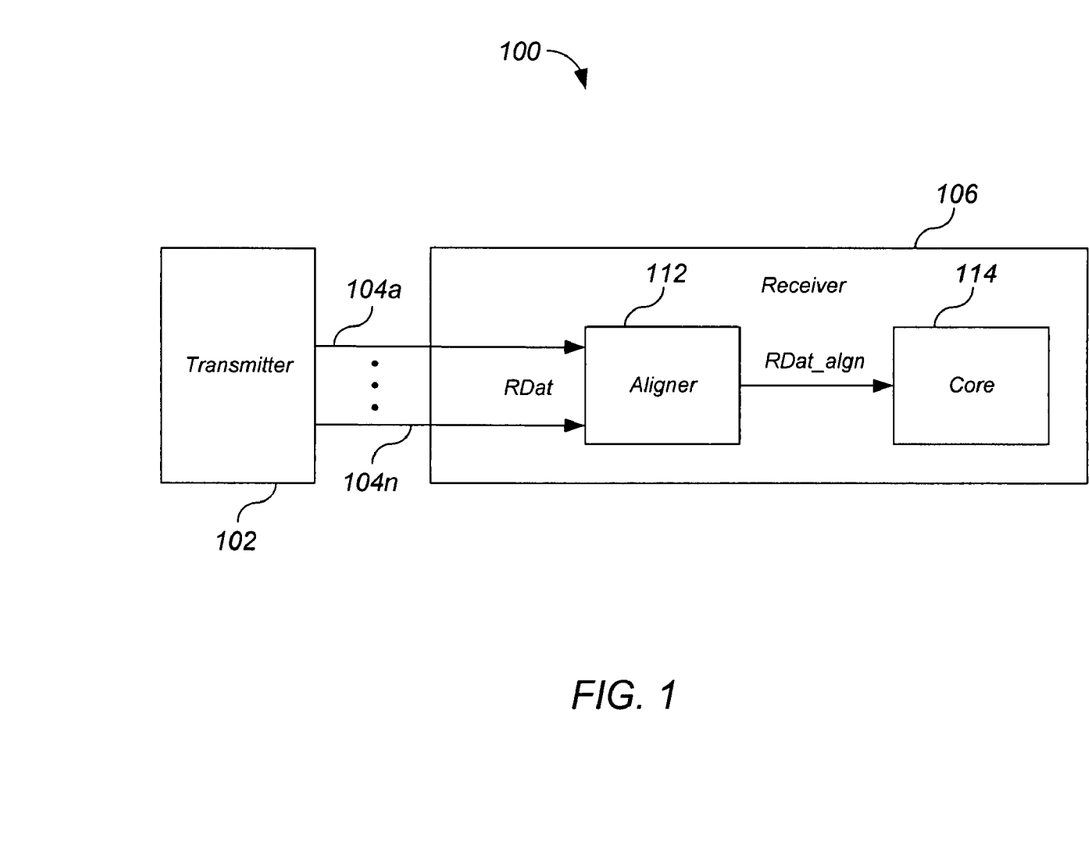
FIG. 1 depicts a communications system according to a preferred embodiment.

FIG. 1 depicts a communications system 100 according to a preferred embodiment. Communications system 100 comprises a transmitter 102 that transmits data over parallel communications channels 104a through 104n to a receiver 106. Receiver 106 comprises an aligner 112 and a core 114. The data is skewed during transmission. The skew is produced by differences between channels 104, and between the corresponding channels within transmitter 102 and receiver 106, such as differing wire lengths and noise. Aligner 112 aligns the data to remove the skew, as described in detail below. Aligner 112 transmits the aligned data to core 114.

In a preferred embodiment, communications between transmitter 102 and receiver 106 conform to the protocol defined by the document entitled "System Packet Interface Level 4 (SPI-4) Phase 2 System Interface for Physical and Link Layer Devices" (hereinafter referred to as SPI-4.2) published by The Optical Internetworking Forum, 39355 California Street, Suite 307, Fremont, Calif. 94538.

SPI-4.2 defines a training pattern that can be used for deskewing bit arrival times on the data and control lines. After reset, the training pattern is repeated continuously until lock is achieved. Thereafter the training pattern is sent at least once every bounded interval data_max_t where data_max_t is a configurable parameter. The training pattern consists of one idle control word followed by a repetitions of a 20-word training pattern consisting of 10 (repeated) training control words TS0 and 10 (repeated) training data words TS1. In a preferred embodiment, $\alpha$ is greater than or equal to 8. Each training word comprises a control bit and 16 data bits. The training words are given by:

$$TS0 = 1\ 0000\ 1111\ 1111\ 1111 \tag{1}$$

$$TS1 = 0\ 1111\ 0000\ 0000\ 0000 \tag{2}$$

The training data word TS1 is orthogonal to the training control word TS0. Thus in each transition from TS0 to TS1, four bits experience a transition from 0 to 1, while the remaining bits experience a transition from 1 to 0. In a preferred embodiment, aligner 112 uses these bit transitions to deskew the data arriving from transmitter 102. To avoid needless repetition, embodiments of the present invention are described for the bits that transition from 0 to 1. The process for the bits that transition from 1 to 0 will be apparent to one skilled in the relevant art after reading this description.

Figure 2:
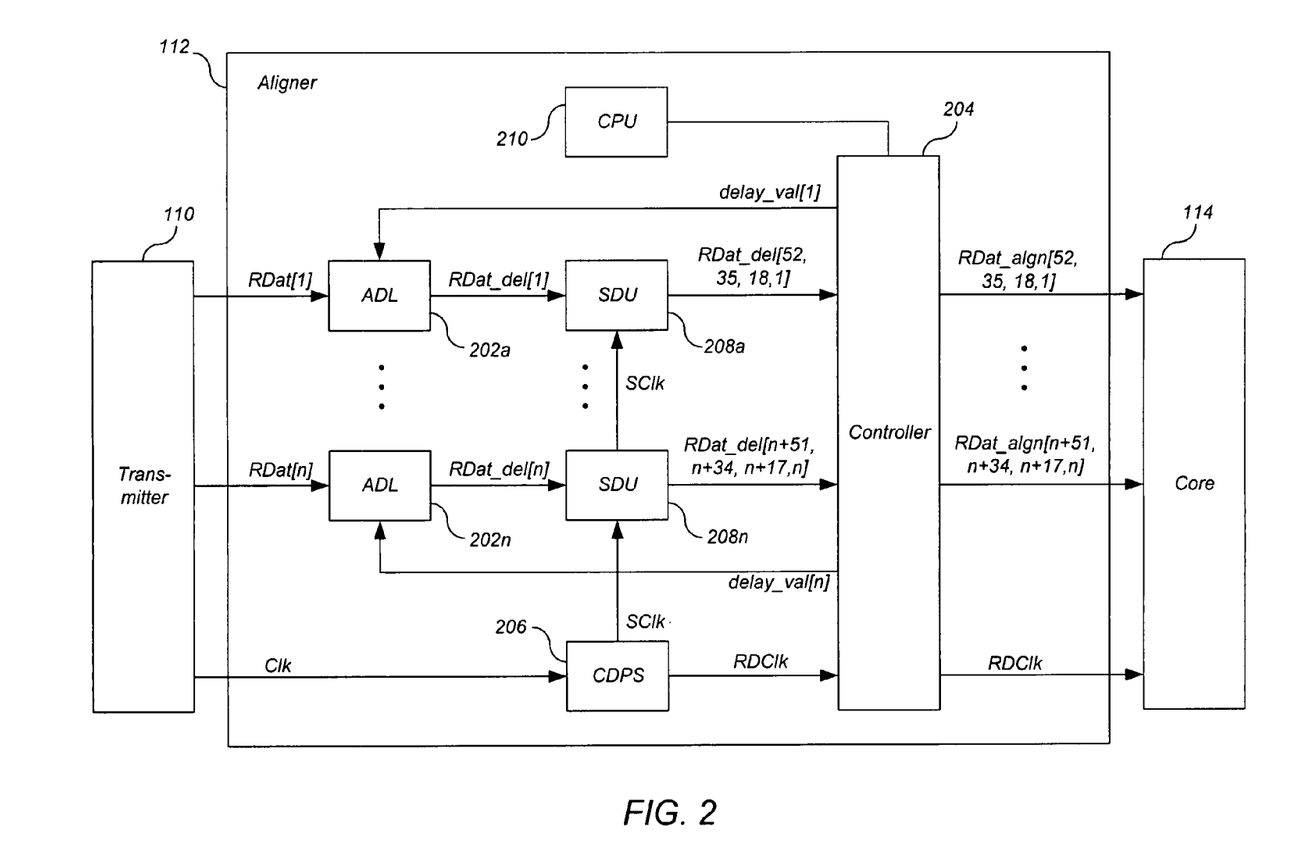
FIG. 2 depicts detail of an aligner according to a preferred embodiment.

FIG. 2 depicts detail of aligner 112 according to a preferred embodiment. Aligner 112 comprises a plurality of analog delay lines 202a through 202n, a plurality of sampling/demux units (SDU) 208a through 208n, a clock divider and phase shifter (CDPS) 206, a controller 204, and a central processing unit (CPU) 210. Aligner 112 receives data signals RDat[1] through RDat[n] and a dual data rate 400 MHz clock signal Clk. CDPS 206 generates a 200 MHz and 400 MHz sampling clocks SClk and a 200 MHz single data rate clock RDClk. Of course, other clock rates can be used. In a preferred embodiment, the bit rate of RDat is 800 mbps, n=17 and RDat includes 16 data bits and a control bit. Each analog delay line 202 receives a bit of Rdat, and delays that bit according to one of signals delay_val[1] through delay_val[n] provided by a controller 204, such that each bit of Rdat can be delayed by a different delay. Each SDU 208 receives one of delayed bits RDat_del[1] through RDat_del[n] and sampling clock SClk, and produces a signal RDat_del[n+51, n+34, n+17, n] that includes 64 data bits and 4 control bits. Controller 204 aligns the bits of signal RDat_del[n+51, n+34, n+17, n] to eliminate deskew, as described in detail below, under the control of CPU 210. Controller 204 then transmits the aligned bits Rdat_algn to core 114.

Figure 3:
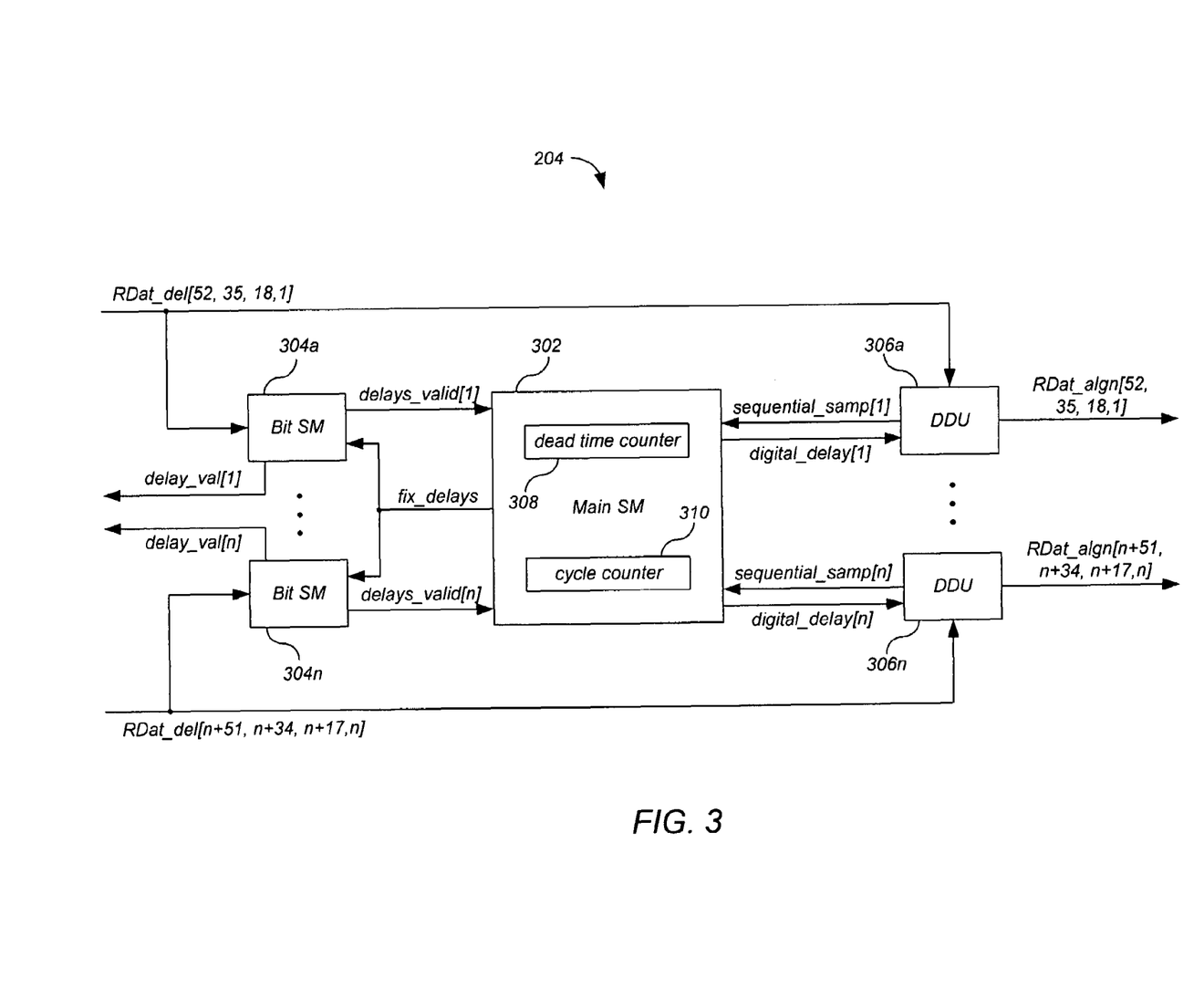
FIG. 3 depicts detail of a controller according to a preferred embodiment.

FIG. 3 depicts detail of controller 204 according to a preferred embodiment. A main state machine 302 controls a plurality of bit state machines 304a through 304n and a plurality of digital delay units 306a through 306n. In a preferred embodiment n=17. Each bit state machine 304 examines the bits Rdat_del arriving on one line of the 17-bit bus, and determines the delay value delay_val to be used by the analog delay line 202 for that bus line. Main state machine 302 examines the bits of Rdat_del arriving on each line of the 17-bit bus, and determines a digital delay value digital_delay for each bus line. Each of digital delay units 306 receives one of the bus lines, provides samples sequential_samp of the bits on that bus line to main state machine 302, and imposes a delay upon that bus line according to the digital_delay signal sent by main state machine 302. Delay value delay_val specifies a delay that is a fraction of two bit times, while delay value digital_delay specifies a delay that is a multiple of a bit time. Main state machine 302 includes a dead time counter 308 and a cycle counter 310 that maintain counts dead_time_count and cycle_count. Dead time counter 308 ensures that aligner 112 aligns the bus only during training patterns. Cycle counter 310 counts the training sequences TS0 and TS1 within the training pattern.

Figure 4:
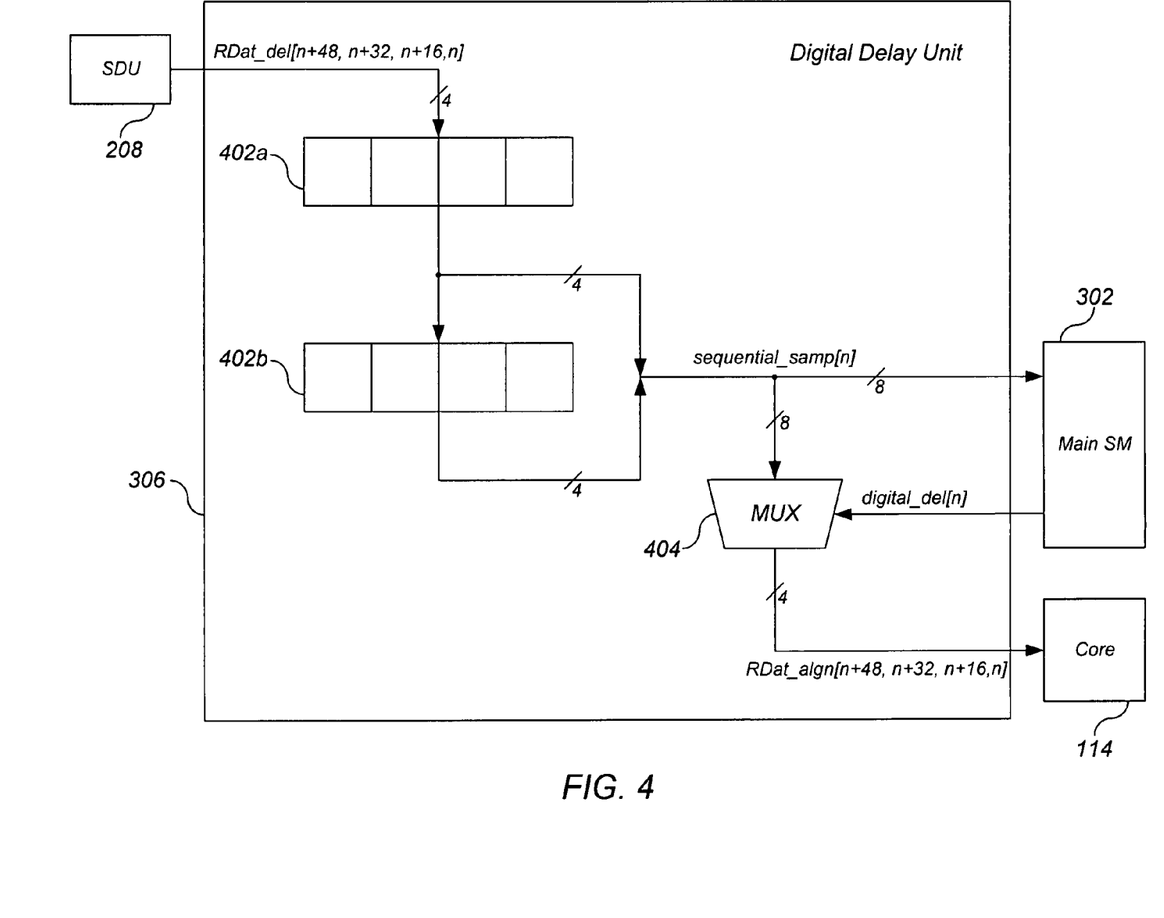
FIG. 4 depicts detail of a digital delay unit according to a preferred embodiment.

FIG. 4 depicts detail of digital delay unit 306 according to a preferred embodiment. Digital delay unit 306 comprises a pair of 4-bit registers 402a and 402b that are clocked such that register 402b contains 4 consecutive bits, and register 402a contains the following 4 consecutive bits, received over one of the lines of the 17-bit bus. The contents of registers 402 are concatenated to provide a sample sequential_samp of 8 consecutive bits to main state machine 302, and to a multiplexer 404. Main state machine 302 processes the sample sequential_samp to produce the digital_delay signal. Multiplexer 404 then selects four consecutive bits from the sample sequential_samp according to the digital_delay signal. Aligner 112 transmits the selected bits to core 114 as aligned data Rdat_algn.

Figure 5:
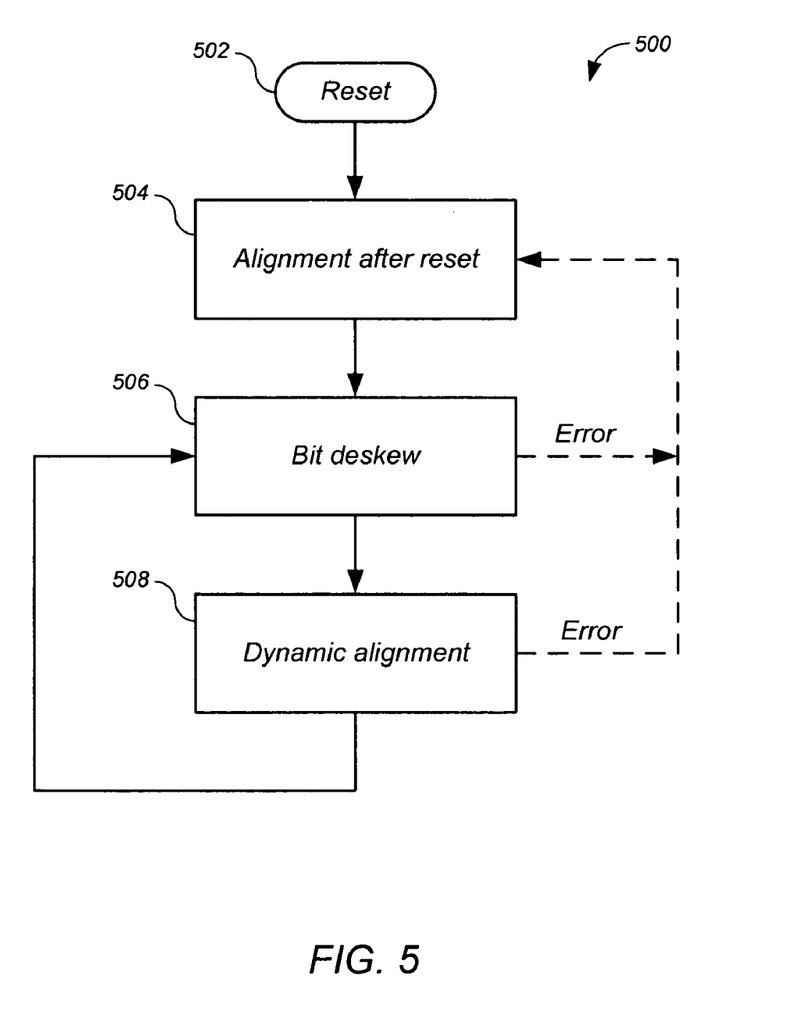
FIG. 5 is a flow depicting a process performed by the aligner of FIG. 2 according to a preferred embodiment.

FIG. 5 is a flow depicting a process 500 performed by aligner 112 according to a preferred embodiment. Process 500 is described in greater detail below. Process 500 begins when a system reset occurs (step 502). Whenever a system reset occurs, each bit state machine 304 performs a process referred to herein as "alignment after reset" (step 504). For each bus line, the alignment after reset process determines the duration of a bit time, and determines a delay value for the corresponding analog delay line 202 that will cause the corresponding digital delay unit 306 to sample that bus line near the middle of the bit time. This process prevents digital delay units 306 from sampling the bus while a bit changes value.

When the delays have been set in analog delay line 202, aligner 112 performs a process referred to herein as "bit deskew" (step 506). For each bus line, a digital delay unit 306 provides a sample of 8 consecutive bits, including the transition from TS0 to TS1, to main state machine 302. Main state machine 302 selects 4 consecutive bits from the 8-bit sample, and causes digital delay unit 306 to transmit the selected 4 bits to core 114 as aligned data Rdat_algn.

When the next training pattern arrives, each bit state machine 304 performs a process referred to herein as "dynamic alignment" (step 508). Each bit state machine 304 obtains 2 pairs of samples as follows. Each bit state machine 304 increases the delay imposed by the corresponding analog delay line 202 by half a bit time (minus a predetermined margin value to avoid sampling during the bit transition), and obtains a first pair of consecutive samples of the bus line, where the transition from TS0 to TS1 falls between the two samples. Then, each bit state machine 304 decreases the delay imposed by the corresponding analog delay line 202 by a half bit time minus the margin (relative to the delay when the dynamic alignment process began), and again obtains a second pair of consecutive samples of the bus line, where the transition from TS0 to TS1 falls between the two samples. The sample pairs are compared to their expected values. For TS0='0', the expected value for the first sample of each pair is '0', and the expected value of the second sample of each pair is '1'. ( )

If the value of the first sample in the second pair of samples differs from its expected value, the bus line has experienced a negative drift; therefore bit state machine 304 increases the delay imposed by analog delay line 202 by a predetermined value (relative to the delay when the dynamic alignment process began). If the value of the second sample in the first pair of samples differs from its expected value, the bus line has experienced a positive drift; therefore bit state machine 304 decreases the delay imposed by analog delay line 202 by a predetermined value (relative to the delay when the dynamic alignment process began). If neither of these conditions occurs, bit state machine 304 leaves the delay imposed by analog delay line 202 the same as when the dynamic alignment process began. Steps 506 and 508 repeat until another system reset occurs, or an error occurs, as described below.

Figure 6:
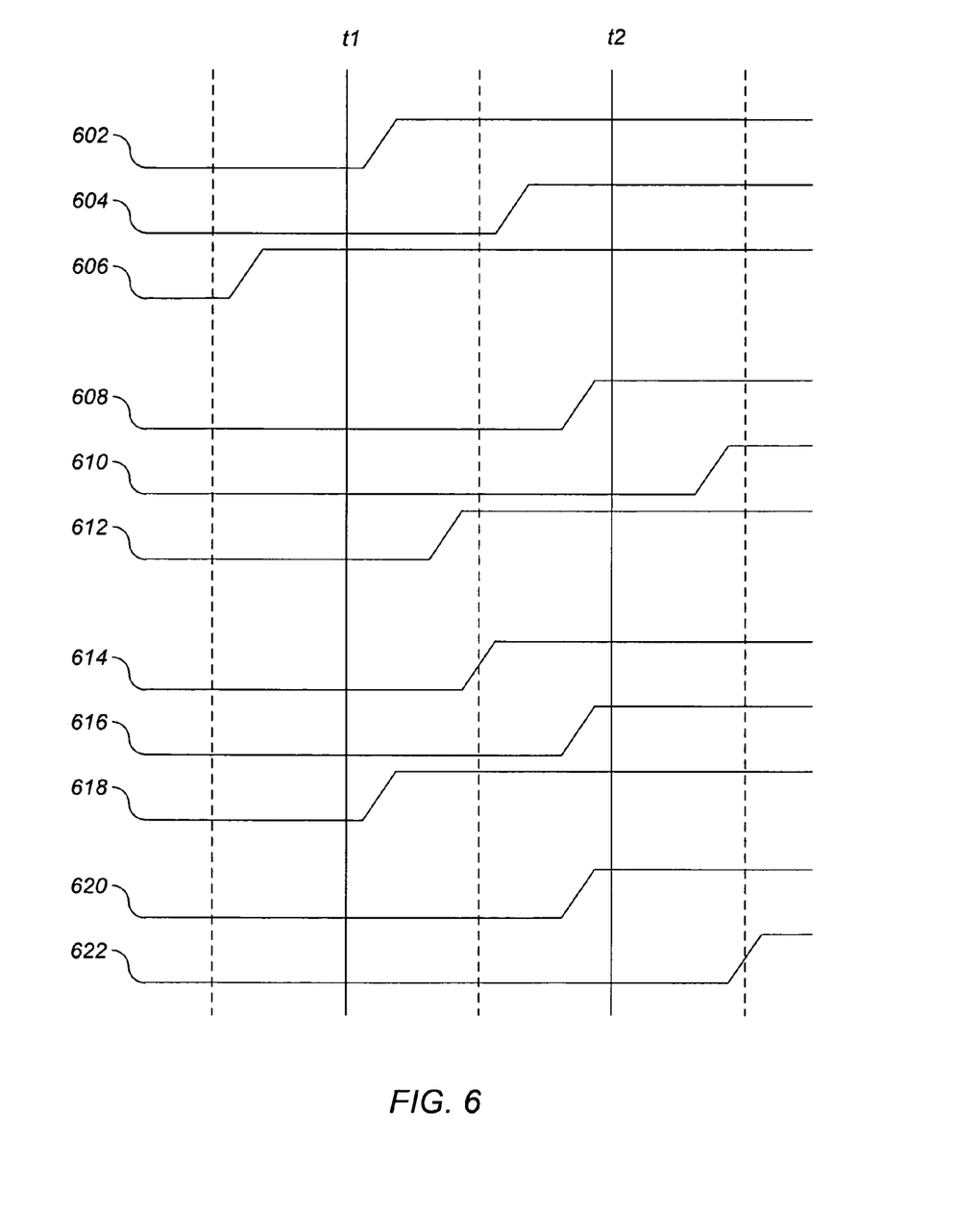
FIG. 6 illustrates a sampling procedure according to a preferred embodiment.

FIG. 6 illustrates these four cases graphically. The consecutive samples are taken at times t1 and t2. Case 602 shows a signal on a bus line that has experienced negative drift. Case 604 shows the signal of case 602 after increasing the delay. Case 606 shows the signal of case 602 after decreasing the delay. From FIG. 6 it is clear that the value of the samples taken at time t1 differ between cases 602 and 606.

Case 608 shows a signal on a bus line that has experienced positive drift. Case 610 shows the signal of case 608 after increasing the delay. Case 618 shows the signal of case 608 after decreasing the delay. From FIG. 6 it is clear that the value of the samples taken at time t2 differ between cases 608 and 610.

Case 614 shows a signal on a bus line that has experienced little or no drift. Case 616 shows the signal of case 614 after increasing the delay. Case 618 shows the signal of case 614 after decreasing the delay. From FIG. 6 it is clear that the values of the samples do not change.

In one case, a bus line has experienced positive drift, but the delay imposed by analog delay line 202 is so small that it cannot be decreased enough to compensate for the positive drift. In this case, instead of decreasing the delay, bit state machine 304 increases the delay by the predetermined value plus one bit time. The added bit time is then corrected during the subsequent bit deskew process 506. Case 620 illustrates this case. Case 622 shows the signal of case 620 after increasing the delay.

Figure 7:
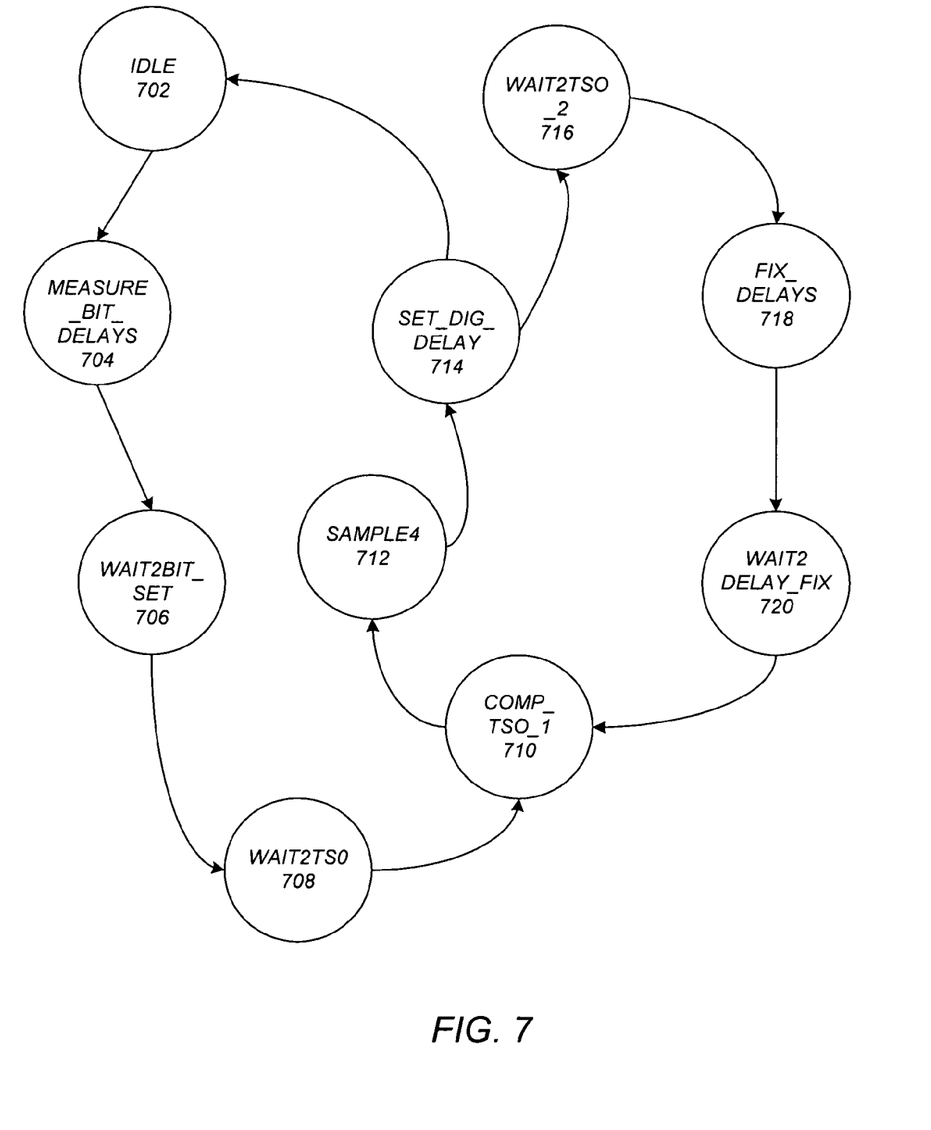
FIG. 7 is a state diagram for a main state machine according to a preferred embodiment.

FIG. 7 is a state diagram for main state machine 302 according to a preferred embodiment. IDLE state 702 is the initial state after reset. In state 702, main state machine 302 monitors Rdat_del until four consecutive control words TS0 arrive, whereupon main state machine 302 moves to MEASURE_BIT_DELAYS state 704. In state 704, main state machine 302 triggers bit state machines 304 to perform an alignment after reset process, as described in detail below, by asserting a signal measure_delays. Main state machine 302 then transitions to WAIT2BIT_SET state 706, where main state machine 302 waits for all of bit state machines 304 to determine appropriate bit delays for analog delay lines 202. Each bit state machine 304 sets a bit of a signal delays_valid when it has asserted a valid signal delay_val. Main state machine 302 transitions to WAIT2TSO state 708 when all of the bits of delays_valid are set.

Main state machine 302 waits in state 708 until four consecutive control words TS0 arrive, whereupon main state machine 302 moves to COMP_TS0_1 state 710. In state 710, main state machine 302 monitors Rdat_del until four consecutive words appear, none of which are TS0. Then main state machine 302 resets cycle counter 310 to zero and assigns a value to a variable Type according to Table 1.

TABLE 1

| Type[1:0] = 0: | Type[1:0] = 1: |
|---|---|
| Cycle 0: XX, XX, TS1, TS1, | Cycle 0: TS0, XX, XX, TS1, |
| Cycle 1: TS1, TS1, TS1, TS1, | Cycle 1: TS1, TS1, TS1, TS1, |
| Cycle 2: TS1, TS1, XX, XX, | Cycle 2: TS1, TS1, TS1, XX, |
| Cycle 3: TS0, TS0, TS0, TS0, | Cycle 3: XX, TS0, TS0, TS0, |
| Cycle 4: TS0, TS0, TS0, TS0, | Cycle 4: TS0, TS0, TS0, TS0, |
| Cycle 0: XX, XX, TS1, TS1, | Cycle 0: TS0, XX, TS1, TS1, |
| Cycle 1: TS1, TS1, TS1, TS1, | Cycle 1: TS1, TS1, TS1, TS1, |
| Type[1:0] = 2: | Type[1:0] = 3: |
| Cycle 0: TS0, TS0, XX, XX, | Cycle 0: TS0, TS0, TS0, XX, |
| Cycle 1: TS1, TS1, TS1, TS1, | Cycle 1: XX, TS1, TS1, TS1, |
| Cycle 2: TS1, TS1, TS1, TS1, | Cycle 2: TS1, TS1, TS1, TS1, |
| Cycle 3: XX, XX, TS0, TS0, | Cycle 3: TS1, XX, XX, TS0, |
| Cycle 4: TS0, TS0, TS0, TS0, | Cycle 4: TS0, TS0, TS0, TS0, |
| Cycle 0: TS0, TS0, XX, XX, | Cycle 0: TS0, TS0, TS0, XX, |
| Cycle 1: TS1, TS1, TS1, TS1, | Cycle 1: XX, TS1, TS1, TS1, |

Cycle counter 310 increments with each four words received, so that the four control words that caused the transition to state 710 constitute Cycle 0 (cycle_count=0), the following four words constitute Cycle 1 (cycle_count=1), and so on up to Cycle 4. Based on the words received during those cycles, one of four Types is selected according to Table 1, where XX represents any word that is not TS0, for example, because the bits on the bus are skewed such that the received word is not TS0. Main state machine 302 then transitions to SAMPLE4 state 712.

In state 712, for each of the 17 bits, main state machine 302 selects four bits of sample sequential_samp as sample four_samples according to Table 2 and the value assigned to variable Type in state 710.

TABLE 2

| Type[1:0] = 0: | Type[1:0] = 1: |
|---|---|
| Cycle 0: <u>XX, XX, TS1, TS1</u>, | Cycle 0: TS0, <u>XX, XX, TS1</u>, |
| Cycle 1: TS1, TS1, TS1, TS1, | Cycle 1: <u>TS1</u>, TS1, TS1, TS1, |
| Type[1:0] = 2: | Type[1:0] = 3: |
| Cycle 0: TS0, TS0, <u>XX, XX</u>, | Cycle 0: TS0, TS0, TS0, <u>XX</u>, |
| Cycle 1: <u>TS1, TS1</u>, TS1, TS1, | Cycle 1: <u>XX, TS1, TS1</u>, TS1, |

The bits selected as four_samples are underlined in Table 2. For example, referring to Table 2, if Type=0, then the first four bits (bits 7 through 4) are selected; if Type 1, then bits 6 through 3 are selected, and so on. Main state machine 302 then transitions to SET_DIG_DELAY state 714.

In state 714, for each of the 17 lines of the bus, main state machine 302 generates the digital_delay signal that causes multiplexer 404 to select four consecutive bits of Rdat_del according to Table 3.

TABLE 3

| four_samples | Rdat |
|---|---|
| 1111 | sequential_samp[7:4] |
| 0111 | sequential_samp[6:3] |
| 0011 | sequential_samp[5:2] |

Referring to Table 3, when four_samples=1111, then multiplexer 404 selects the four most-significant bits of sequential_samp, when four_samples=0111, then multiplexer 404 selects the bits 6 through 3 of sequential_samp, and when four_samples=0011, then multiplexer 404 selects bits 5 through 2 of sequential_samp. However, if the selected samples are invalid (that is, if four_samples has none of the values in Table 3), main state machine 302 returns to IDLE state 702. But if the link is up and dead time counter 308 indicates that the previous training sequence has ended, main state machine 302 transitions to WAIT2TS0_2 state 716.

Main state machine 302 waits in state 716 until four consecutive control words TS0 arrive, whereupon main state machine 302 moves to FIX_DELAYS state 718. In state 718, main state machine 302 triggers bit state machines 304 to perform a dynamic alignment process, as described in detail below, by asserting a signal fix_delays. Main state machine 302 then transitions to WAIT2DELAY_FIX state 720, where main state machine 302 waits for all of bit state machines 304 to determine appropriate bit delays for analog delay lines 202. Each bit state machine 304 sets a bit of signal delays_valid when it has asserted a valid signal delay_val. When all of the bits of signal delays_valid are set, main state machine 302 resets dead time counter 308 to zero to prevent main state machine 302 from re-entering the alignment process until the next training sequence, and then transitions to WAIT2TS0 state 708.

Figure 8:
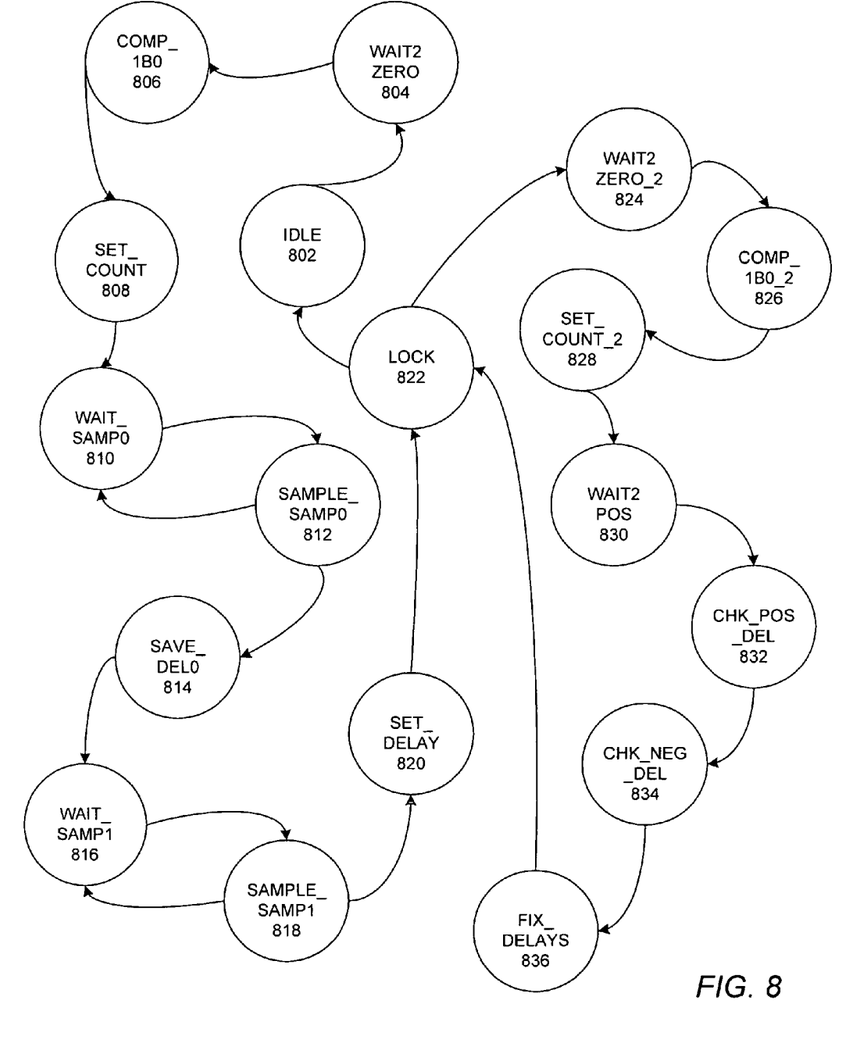
FIG. 8 is a state diagram for a bit state machine according to a preferred embodiment.

FIG. 8 is a state diagram for each bit state machine 304 according to a preferred embodiment. Each bit state machine 304 includes a cycle counter to count the training sequences in the training pattern. IDLE state 802 is the initial state after reset. When main state machine 302 asserts the measure_delays signal, bit state machines 304 perform an alignment after reset process according to states 804 through 820. In WAIT2ZERO state 804, bit state machine 304 waits until four consecutive bits on its bus line are all zeros (indicating that TS0 has begun), whereupon bit state machine 304 transitions to COMP_1B0 state 806. In state 806, bit state machine 304 waits until four consecutive bits are not all zeros (indicating the transition from TS0 to TS1), whereupon bit state machine 304 transitions to SET_COUNT state 808.

In state 808, bit state machine 304 locates the transition from TS0 to TS1 to a resolution of one bit time by identifying the first two samples after the transition as samp0 and samp1. Bit state machine 304 resets its cycle counter Referring to Table 4, four Types are possible based on the values of the bits received in cycles 0 and 1, where the first bit in each cycle is the most-significant bit.

TABLE 4

| Type[1:0] = 0: | Type[1:0] = 1: |
|---|---|
| Cycle 0: {<u>1</u>, 1, 1, 1} | Cycle 0: {0, <u>1</u>, 1, 1} |
| Cycle 1: {1, 1, 1, 1} | Cycle 1: {1, 1, 1, 1} |
| Type[1:0] = 2: | Type[1:0] = 3: |
| Cycle 0: {0, 0, <u>1</u>, 1} | Cycle 0: {0, 0, 0, <u>1</u>} |
| Cycle 1: {1, 1, 1, 1} | Cycle 1: {<u>1</u>, 1, 1, 1} |

The cycle counter increments with each four bits received, so that the four bits that caused the transition to state 808 constitute Cycle 0 (cycle_count=0), the following four bits constitute Cycle 1 (cycle_count=1), and so on. Based on the bits received during those cycles, one of four Types is defined according to Table 4. The underlined bits for the defined type are selected. For example, for Type=0, samp0 and samp1 are the first two bits in Cycle 0, respectively, while for Type=3, samp0 is the least-significant bit of Cycle 0, while samp1 is the most-significant bit of Cycle 1. Bit state machine 304 then transitions to WAIT_SAMP0 state 810.

Bit state machine 304 waits in state 810 until its cycle counter again reaches 0 (indicating the transition from TS0 to TS1), whereupon bit state machine 304 transitions to SAMPLE_SAMP0 state 812. In state 812 bit state machine 304 obtains sample samp0 by sampling the bit specified by Table 4 according to the value assigned to variable Type in state 808. Bit state machine 304 also increments variable delay_val. If samp0=1, bit state machine 304 returns to state 810. But if samp0=0, bit state machine 304 transitions to SAVE_DEL0 state 814. In state 814, bit state machine 304 assigns the value of variable delay_val to a variable delay2samp0. Bit state machine 304 then transitions to WAIT_SAMP1 state 816.

Bit state machine 304 waits in state 816 until its cycle counter reaches sampling_cycle_2d, which has a value of 1 when Type=3 and a value of zero otherwise, whereupon bit state machine 304 transitions to SAMPLE_SAMP1 state 818. In state 818 bit state machine 304 obtains sample samp1 by sampling the bit specified by Table 4 according to the value assigned to the variable Type in state 808. Bit state machine 304 also increments variable delay_val. If samp1=1, bit state machine 304 returns to state 816. But if samp1=0, bit state machine 304 transitions to SET_DELAY state 820. In state 820, bit state machine 304 assigns the value of variable delay_val to variable delay2samp1. Bit state machine 304 also assigns the value of variable delay_val to variable current_delay_val for use in the subsequent dynamic alignment process. Bit state machine 304 also calculates the bit time on the bus line according to $$bit\_time = delay2samp1 - delay2samp0 \tag{3}$$

Bit state machine 304 also sets delay_val according to $$\text{If } (delay2samp0 > bit\_time/2) \text{ then} \tag{4}$$

$$Delay\_val = delay2samp0 - bit\_time/2$$

Else $$Delay\_val = delay2samp0 + bit\_time/2$$

Bit state machine 304 then transitions to LOCK state 822, where bit state machine 304 sets a bit in delays_valid, thereby indicating to main state machine 302 that its delay is valid. The alignment after reset process is then complete for bit state machine 304.

Figure 9:
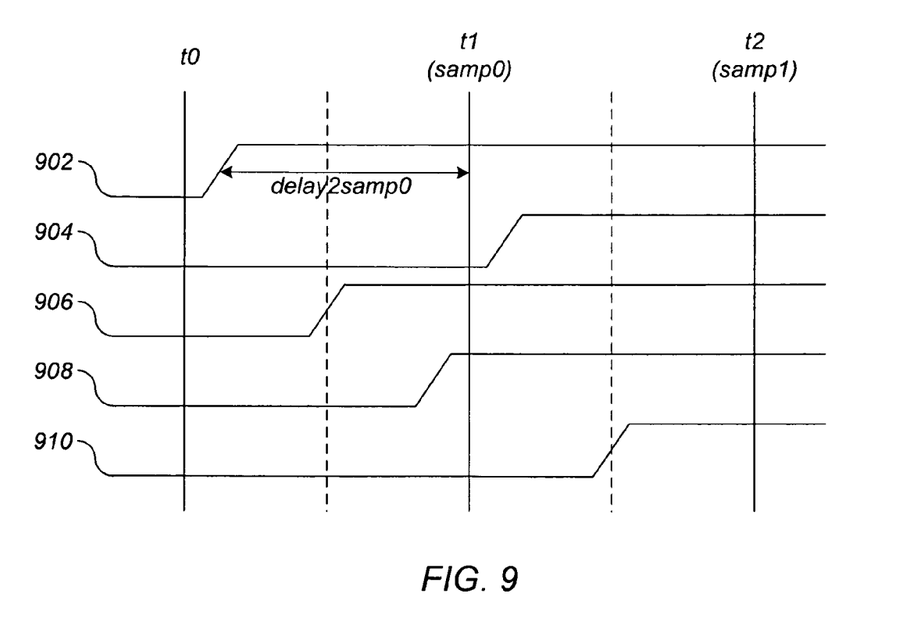
FIG. 9 is a timing diagram that graphically illustrates an alignment after reset process.

FIG. 9 is a timing diagram that graphically illustrates the alignment after reset process. Case 902 shows a signal on the bus line before the alignment after reset process when delay2samp0>bit_time/2. The process increases the delay imposed on the signal by the corresponding analog delay line 202 until the value of samp0 changes, as shown in case 904, where the delay added by the process is delay2samp0. The process then simply increases the delay of analog delay line by delay2samp0−bit_time/2. Case 906 shows the resulting alignment.

Case 908 shows a signal on the bus line before the alignment after reset process when delay2samp0<bit_time/2. Again the process increases the delay imposed on the signal by the corresponding analog delay line 202 until the value of samp0 changes, as in case 904, where the delay added by the process is delay2samp0. The process then increases the delay of analog delay line by delay2samp0+bit_time/2. Case 910 shows the resulting alignment.

Returning to FIG. 8, the dynamic alignment process is now described. Bit state machine 304 waits in state 822. If CPU 210 asserts the restart_training signal, main state machine 302 returns to IDLE state 802. Alternatively, if the main state machine 302 triggers the dynamic alignment process by asserting the fix_delays signal, and dynamic alignment is enabled (that is, the dynamic_align_en signal is asserted by CPU 210), bit state machine 304 transitions to WAIT2ZERO_2 state 824.

In state 824, bit state machine 304 waits until four consecutive bits on its bus line are all zeros (indicating that TS0 has begun), whereupon bit state machine 304 transitions to COMP_1B0_2 state 826. In state 826, bit state machine 304 waits until four consecutive bits are not all zeros (indicating the transition from TS0 to TS1), whereupon bit state machine 304 transitions to SET_COUNT_2 state 828.

In state 828, bit state machine 304 locates the transition from TS0 to TS1 in the same manner as described for state 808, and then transitions to WAIT2POS state 830. In state 830, bit state machine 304 increases the delay imposed by analog delay line 202 by half a bit time (minus a predetermined margin value to avoid sampling during the bit transition) by setting the value of variable delay_val according to If (delay_*val*+bit_time/2−margin)<bit_time*2   (5)

Set delay_*val*=current_delay_*val*+(bit_time/2−margin)

Else

Set delay_*val*=current_delay_*val*−(bit_time/2+margin)

Bit state machine 304 transitions to CHK_POS_DEL state 832 when cycle counter 310 reaches zero. In state 832, bit state machine 304 obtains a sample of the bus line. Referring to FIG. 9, this sample is taken at time t2. Bit state machine 304 then tests that sample against a predetermined expected value, which is the value the bus line should have for TS1. If the sample has the expected value, bit state machine 304 sets a flag Pos_samp; if not bit state machine 304 clears flag Pos_samp. Bit state machine 304 then decreases the delay imposed by analog delay line 202 by a half bit time minus the margin (relative to the delay when the dynamic alignment process began) by setting the value of variable delay_val according to If (current_delay_*val*−(bit_time/2−margin))>0   (6)

Set delay_*val*=current_delay_*val*−(bit_time/2−margin)

Else

Set delay_*val*=current_delay_*val*+(bit_time/2+margin)

Bit state machine 304 transitions to CHK_NEG_DEL state 834 when the value of cycle counter 310 reaches sampling_cycle_0$^{th}$, which has a value of 4 when Type=0 and a value of zero otherwise. In state 834, bit state machine 304 obtains a sample of the bus line. Referring to FIG. 9, this sample is taken at time t1. Bit state machine 304 then tests that sample against the predetermined expected value, which again is the value the bus line should have for TS1. If the sample has the expected value, bit state machine 304 sets a flag Neg_samp; if not bit state machine 304 clears flag Neg_samp. Bit state machine 304 then transitions to FIX_DELAYS state 836.

In state 836, bit state machine 304 adjusts the delay imposed by the corresponding analog delay line 202, if necessary, by incrementing the delay by a predetermined value fix_step, decrementing the delay by fix_step, or neither incrementing nor decrementing the delay value. The delay value delay_val is set according to If (*Pos_samp*=0) and (*Neg_samp*=1)   (7)

If (current_delay_*val*+fix_step)<bit_time

Set delay_*val*=current_delay_*val*+fix_step

Else

Set delay_*val*=current delay_*val*+fix_step−bit_time

Else if (*Pos_samp*=1) and (*Neg_samp*=0)

If (delay_*val*+fix_step)>0

Set delay_*val*=current_delay_*val*−fix_step

Else

Set delay_*val*=current_delay_*val*−fix_step+bit_time

Bit state machine 304 then returns to LOCK state 832.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. For example, the techniques disclosed herein are not limited to the interface between a MAC and a LLD, or to the SPI-4.2 interface, but apply equally well to other network interfaces, such as the emerging SPI-5 interface and the Network Processing Forum Streaming Interface (NPFSI), and to interfaces between other devices, such as the SPI-4.2 interfaces that exist between network processors and classification engines. Accordingly, other implementations are within the scope of the following claims.

What is claimed is:

1. An alignment circuit, comprising:
   a plurality of inputs that receive corresponding data signals, wherein each of the corresponding data signals includes a training pattern;
   a plurality of delay lines that correspond to each of the plurality of inputs, that receive the corresponding data signals, that receive a plurality of corresponding delay signals, and that delay each of the data signals according to the corresponding delay signals; and
   a controller that receives the corresponding data signals and that generates the plurality of corresponding delay signals based on the training patterns of respective ones of the data signals.

2. A receiver that includes the alignment circuit of claim 1.

3. The alignment circuit of claim 1 wherein the training pattern includes a System Packet Interface Level 4 Phase 2 System Interface for Physical and Link Layer Devices (SPI-4.2) training pattern.

4. The alignment circuit of claim 1 wherein the delay lines include analog delay lines.

5. The alignment circuit of claim 4 wherein the delay signals include analog delay signals.

6. The alignment circuit of claim 5 further comprising a plurality of digital delay units that each delay a respective one of the data signals by m bit times based on a corresponding digital delay signal, wherein m is greater than or equal to zero.

7. The alignment circuit of claim 6 wherein the controller generates the corresponding digital delay signals based on the training patterns in the corresponding data signals.

8. The alignment circuit of claim 7 wherein:
   the training pattern includes a plurality of predetermined transitions from a first predetermined data value to a second predetermined data value; and
   the controller determines a bit time of the data signals based on the training pattern in the respective data signal, samples the respective data signal once each bit time to obtain data samples, and provides the respective one of the analog delay signals such that the respective analog delay line delays the respective data signal so that the transitions occur at a midpoint between the data samples.

9. The alignment circuit of claim 8 wherein each of the analog delay signals represents a delay imposed by the respective analog delay line upon the respective data signal, and wherein the controller:
   obtains a first early sample preceding a first one of the transitions and a first late sample following the first one of the transitions;
   increases the delay one half of the bit time;
   obtains a second late sample following a second one of the transitions;
   decreases the delay by one half of the bit time;
   obtains a second early sample preceding a third one of the transitions; and
   decreases the delay by a predetermined amount when the values of the first and second late samples differ, and increases the delay by the predetermined amount when the values of the first and second early samples differ.

10. The alignment circuit of claim 8 wherein the controller:
    repeatedly increases the delay until the first sample following the transition changes value, thereby producing a first delay increase; and
    repeatedly increases the delay until the second sample following the transition changes value, thereby producing a second delay increase,
       wherein the difference between the first and second delay increases is the bit time of the respective delayed data signal.

11. The alignment circuit of claim 6 wherein the training pattern includes a plurality of predetermined transitions from a first predetermined data value to a second predetermined data value, each of the digital delay units samples the data signals to obtain a plurality of consecutive data samples including a data sample preceding one of the transitions and a data sample following the one of the transitions, and the number m of the bit times is selected based on a location of the training pattern in the plurality of consecutive samples.

12. The alignment circuit of claim 11 wherein each of the analog delay signals represents a delay imposed by the respective analog delay line upon the respective data signal, and wherein the controller:
    obtains a first early sample preceding a first one of the transitions and a first late sample following the first one of the transitions;
    increases the delay by one half of the bit time;
    obtains a second late sample following a second one of the transitions;
    decreases the delay by one half of the bit time;
    obtains a second early sample preceding a third one of the transitions; and
    decreases the delay by a predetermined amount when the values of the first and second late samples differ, and increases the delay by the predetermined amount when the values of the first and second early samples differ.

13. The alignment circuit of claim 11 wherein the controller:
    repeatedly increases the delay until the first sample following the transition changes value, thereby producing a first delay increase; and
    repeatedly increases the delay until the second sample following the transition changes value, thereby producing a second delay increase,
       wherein the difference between the first and second delay increases is the bit time of the respective data signal.

14. The alignment circuit of claim 10 wherein:
    the training pattern includes a plurality of predetermined transitions from a first predetermined data value to a second predetermined data value;
    each of the digital delay units samples the respective data signal to obtain a plurality of consecutive data samples including a data sample preceding one of the transitions and a data sample following the one of the transitions; and
    the number m of bit times is selected based on a location of the training pattern in the plurality of consecutive samples.

15. A method for aligning data, comprising:
    receiving corresponding data signals at a plurality of inputs, wherein each of the corresponding data signals includes a training pattern;
    receiving the data signals at a plurality of delay lines that correspond to each of the plurality of inputs;
    receiving a plurality of corresponding delay signals at the plurality of delay lines;
    delaying each of the data signals according to the corresponding delay signals; and generating the plurality of corresponding delay signals based on the training patterns of respective ones of the data signals.

16. The method of claim 15 wherein the training pattern includes a System Packet Interface Level 4 Phase 2 System Interface for Physical and Link Layer Devices (SPI-4.2) training pattern.

17. The method of claim 15 wherein the delay lines include analog delay lines.

18. The method of claim 17 wherein the delay signals include analog delay signals.

19. The method of claim 18 further comprising delaying respective ones of the data signals by m bit times based on a corresponding digital delay signal at a plurality of digital delay units, wherein m is greater than or equal to zero.

20. The method of claim 19 further comprising generating the corresponding digital delay signals based on the training patterns in the corresponding data signals.

21. The method of claim 20 wherein the training pattern includes a plurality of predetermined transitions from a first predetermined data value to a second predetermined data value and further comprising:
determining a bit time of the data signals based on the training pattern in the respective data signal;
sampling the respective data signal once each bit time to obtain data samples; and
providing the respective one of the analog delay signals such that the respective analog delay line delays the respective data signal so that the transitions occur at a midpoint between the data samples.

22. The method of claim 21 wherein each of the analog delay signals represents a delay imposed by the respective analog delay line upon the respective data signal, and further comprising:
obtaining a first early sample preceding a first one of the transitions and a first late sample following the first one of the transitions;
increasing the delay one half of the bit time;
obtaining a second late sample following a second one of the transitions;
decreasing the delay by one half of the bit time;
obtaining a second early sample preceding a third one of the transitions;
decreasing the delay by a predetermined amount when the values of the first and second late samples differ; and
increasing the delay by the predetermined amount when the values of the first and second early samples differ.

23. The method of claim 21 further comprising:
repeatedly increasing the delay until the first sample following the transition changes value, thereby producing a first delay increase; and
repeatedly increasing the delay until the second sample following the transition changes value, thereby producing a second delay increase,
wherein the difference between the first and second delay increases is the bit time of the respective delayed data signal.

24. The method of claim 19 wherein the training pattern includes a plurality of predetermined transitions from a first predetermined data value to a second predetermined data value, each of the digital delay units samples the data signals to obtain a plurality of consecutive data samples including a data sample preceding one of the transitions and a data sample following the one of the transitions, and the number m of the bit times is selected based on a location of the training pattern in the plurality of consecutive samples.

25. The method of claim 24 wherein each of the analog delay signals represents a delay imposed by the respective analog delay line upon the respective data signal, and further comprising:
obtaining a first early sample preceding a first one of the transitions and a first late sample following the first one of the transitions;
increasing the delay by one half of the bit time;
obtaining a second late sample following a second one of the transitions;
decreasing the delay by one half of the bit time;
obtaining a second early sample preceding a third one of the transitions;
decreasing the delay by a predetermined amount when the values of the first and second late samples differ; and
increasing the delay by the predetermined amount when the values of the first and second early samples differ.

26. The method of claim 24 further comprising:
repeatedly increasing the delay until the first sample following the transition changes value, thereby producing a first delay increase; and
repeatedly increasing the delay until the second sample following the transition changes value, thereby producing a second delay increase,
wherein the difference between the first and second delay increases is the bit time of the respective data signal.

27. The method of claim 23 wherein:
the training pattern includes a plurality of predetermined transitions from a first predetermined data value to a second predetermined data value;
each of the digital delay units samples the respective data signal to obtain a plurality of consecutive data samples including a data sample preceding one of the transitions and a data sample following the one of the transitions; and
the number m of bit times is selected based on a location of the training pattern in the plurality of consecutive samples.

* * * * *